US008555399B2

(12) United States Patent  (10) Patent No.: US 8,555,399 B2
Kasahara  (45) Date of Patent: Oct. 8, 2013

(54) INFORMATION PROCESSING APPARATUS AND METHOD AND STORAGE MEDIUM

(75) Inventor: Kimito Kasahara, Kawasaki (JP)

(73) Assignee: Canon Kabushiki Kaisha (JP)

( * ) Notice: Subject to any disclaimer, the term of this patent is extended or adjusted under 35 U.S.C. 154(b) by 407 days.

(21) Appl. No.: 12/756,582

(22) Filed: Apr. 8, 2010

(65) Prior Publication Data

US 2010/0263054 A1 Oct. 14, 2010

(30) Foreign Application Priority Data

Apr. 13, 2009 (JP) ................................. 2009-096999

(51) Int. Cl.
*G06F 21/24* (2006.01)
(52) U.S. Cl.
USPC .......................................................... 726/26
(58) Field of Classification Search
USPC .......................................................... 726/26
See application file for complete search history.

(56) References Cited

U.S. PATENT DOCUMENTS

| | | | | |
|---|---|---|---|---|
| 2005/0289126 A1* | 12/2005 | Koguchi | ........................... | 707/3 |
| 2007/0013945 A1* | 1/2007 | Yoshida et al. | .............. | 358/1.15 |
| 2007/0081399 A1* | 4/2007 | Kishimoto | ............... | 365/189.05 |
| 2009/0021781 A1* | 1/2009 | Yoon | ............................. | 358/1.15 |
| 2009/0147292 A1* | 6/2009 | Shimura et al. | ............... | 358/1.14 |
| 2009/0231603 A1* | 9/2009 | Takemoto | ...................... | 358/1.9 |

FOREIGN PATENT DOCUMENTS

| | | |
|---|---|---|
| JP | 2002-288040 A | 10/2002 |
| JP | 2004-222141 A | 8/2004 |
| JP | 2005-158038 A | 6/2005 |
| JP | 2006-114992 A | 4/2006 |
| JP | 2007-081652 A | 3/2007 |

OTHER PUBLICATIONS

Japanese Office Action issued in Japanese counterpart application No. JP2009-096999, dated Feb. 19, 2013.

* cited by examiner

*Primary Examiner* — Matthew Smithers
(74) *Attorney, Agent, or Firm* — Rossi, Kimms & McDowell LLP

(57) ABSTRACT

An information processing apparatus capable of preventing user's personal information from leaking even when transmission destination information managed in a user-specific address book is transferred to an apparatus users' shared address book. The apparatus is equipped with a function for managing destination information n on a destination indicative of an external apparatus to which data is to be transmitted. An apparatus users' shared address book area stored destination information available to any user. A user-specific address book area stores destination information which can be accessed only by a specific user. When the destination information stored in the user-specific address book is transferred to the apparatus users' shared address book in response to a user's operation, user's personal information included in the destination information is deleted before the transfer.

17 Claims, 11 Drawing Sheets

FIG.8

| ENTRY OF NEW USER ACCOUNT | |
|---|---|
| USER NAME | kashima |
| PASSWORD | ****** |

OK

INFORMATION PROCESSING APPARATUS AND METHOD AND STORAGE MEDIUM

BACKGROUND OF THE INVENTION

1. Field of the Invention

The present invention relates to an information processing apparatus and method which are capable of transmitting data by designating a transmission destination.

2. Description of the Related Art

Conventionally, for an information processing apparatus which is capable of transmitting data by designating a transmission destination, there has been proposed a technique related to protection of personal information in user-specific address books each of which comprises items of transmission destination information which can be accessed only by an associated registered user (see e.g. Japanese Patent Laid-Open Publication No. 2006-114992). To use transmission destination information stored in each user-specific address book, authentication is required to confirm that the user is a registered user.

However, if an address book which can be accessed by all the users of the information processing apparatus (hereinafter referred to as "the apparatus users' shared address book") is managed in addition to the user-specific address books, it is envisaged that transmission destination information is transferred from the user-specific address books to the apparatus users' shared address book. For example, if a user B wishes to use transmission destination information registered by a user A in a user-specific address book for dedicated use by the user A, it is necessary to transfer the transmission destination from the user A's address book to the apparatus users' shared address book.

However, if the user A's personal information is contained in the transmission destination information to be transferred to the apparatus users' shared address book, a problem occurs that the transfer of the transmission destination information to the apparatus users' shared address book makes the user A's personal information accessible to an indefinite number of users who use the information processing apparatus. The personal information includes, for example, authentication information for logging in to a server which is a destination of data transmission. The authentication information, which comprises e.g. a user name and a password, is for indicating that the user attempting to connect to the server is authorized to connect to the server. Therefore, if the user A's authentication information is made accessible to an unspecified number of users, there is a fear that spoofing or the like occurs, thereby causing a security problem.

SUMMARY OF THE INVENTION

The present invention provides an information processing apparatus and method which are capable of preventing user's personal information from leaking even when transmission destination information managed in a user-specific address book is transferred to an apparatus users' shared address book, and a computer-readable storage medium storing a program for causing a computer to execute the method.

In a first aspect of the present invention, there is provided an information processing apparatus equipped with a function for managing destination information on a destination indicative of an external apparatus to which data is to be transmitted, comprising a first storage unit configured to store destination information which is accessible to unlimited users, a second storage unit configured to store destination information which is accessible to a specific user, a destination transfer unit configured to transfer the destination information stored in the second storage unit to the first storage unit in response to an operation by the specific user, and a first deletion unit configured to be operable when the destination information is transferred by the destination transfer unit, to delete personal information of the specific user that is included in the destination information.

In a second aspect of the present invention, there is provided an information processing apparatus equipped with a function for managing destination information on a destination indicative of an external apparatus to which data is to be transmitted, comprising a first storage unit configured to store destination information which is accessible to unlimited users, a second storage unit configured to store destination information which is accessible to a specific user, a destination transfer unit configured to transfer the destination information stored in the second storage unit to the first storage unit in response to an operation by the specific user, and an addition unit configured to be operable when the destination information is transferred by the destination transfer unit, to add control information for requesting a user to input personal information to be included in the destination information each time data transmission is performed, to the destination information.

In a third aspect of the present invention, there is provided a method of processing information for an information processing apparatus equipped with a function for managing destination information on a destination indicative of an external apparatus to which data is to be transmitted, the information processing apparatus including a first storage unit configured to store destination information which is accessible to unlimited users, and a second storage unit configured to store destination information which is accessible to a specific user, the method comprising transferring the destination information stored in the second storage unit to the first storage unit, and deleting, when the destination information is transferred by the transferring, personal information of the specific user that is included in the destination information.

In a fourth aspect of the present invention, there is provided a method of processing information for an information processing apparatus equipped with a function for managing destination information on a destination indicative of an external apparatus to which data is to be transmitted, the information processing apparatus including a first storage unit configured to store destination information which is accessible to unlimited users, and a second storage unit configured to store destination information which is accessible to a specific user, the method comprising transferring the destination information stored in the second storage unit to the first storage unit, and adding, when the destination information is transferred by the transferring, control information for requesting a user to input personal information to be included in the destination information each time data transmission is performed, to the destination information.

In a fifth aspect of the present invention, there is provided a computer-readable storage medium which stores a computer-readable program for causing a computer to execute a method of processing information for an information processing apparatus equipped with a function for managing destination information on a destination indicative of an external apparatus to which data is to be transmitted, the information processing apparatus including a first storage unit configured to store destination information which is accessible to unlimited users, and a second storage unit configured to store destination information which is accessible to a specific user, wherein the method comprises transferring the destination information stored in the second storage unit to the first storage unit, and deleting, when the destination information is transferred by the transferring, personal information of the specific user that is included in the destination information.

In a sixth aspect of the present invention, there is provided a computer-readable storage medium which stores a computer-readable program for causing a computer to execute a method of processing information for an information processing apparatus equipped with a function for managing destination information on a destination indicative of an external apparatus to which data is to be transmitted, the information processing apparatus including a first storage unit configured to store destination information which is accessible to unlimited users, and a second storage unit configured to store destination information which is accessible to a specific user, wherein the method comprises transferring the destination information stored in the second storage unit to the first storage unit, and adding, when the destination information is transferred by the transferring, control information for requesting a user to input personal information to be included in the destination information each time data transmission is performed, to the destination information.

According to the present invention, even when the transmission destination information managed in a user-specific address book is transferred to an apparatus users' shared address book, it is possible to prevent the user's personal information from leaking.

Further features of the present invention will become apparent from the following description of exemplary embodiments with reference to the attached drawings.

BRIEF DESCRIPTION OF THE DRAWINGS

FIG. 8 is a view showing an example of an alternate entry request screen displayed on a UI section of a multifunction peripheral which is an information processing apparatus according to a second embodiment of the present invention.

DETAILED DESCRIPTION OF THE EMBODIMENTS

The present invention will now be described in detail below with reference to the accompanying drawings showing embodiments thereof.

Figure 1:
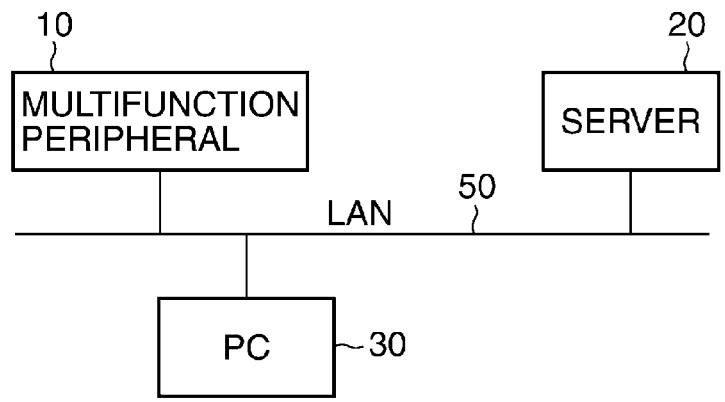
FIG. 1 is a view showing an example of the configuration of a document management system including an information processing apparatus according to a first embodiment of the present invention.

FIG. 1 is a view showing an example of the configuration of a document management system including an information processing apparatus according to a first embodiment of the present invention.

As shown in FIG. 1, the document management system comprises a multifunction peripheral 10 as the information processing apparatus according to the first embodiment which is an image forming apparatus equipped with e.g. an image reading function and a printing function, a server 20 which is an information processing apparatus, and a personal computer (PC) 30, and these components are connected to one another via a LAN 50.

The server 20 is capable of transmitting and receiving files of e.g. image data and document data to and from the multifunction peripheral 10 and the PC 30, using the FTP protocol and/or the SMB protocol, and transmitting and receiving e-mails. Also, the server 20 and the PC 30 are capable of instructing the multifunction peripheral 10 to print, using a printer driver.

Figure 2:
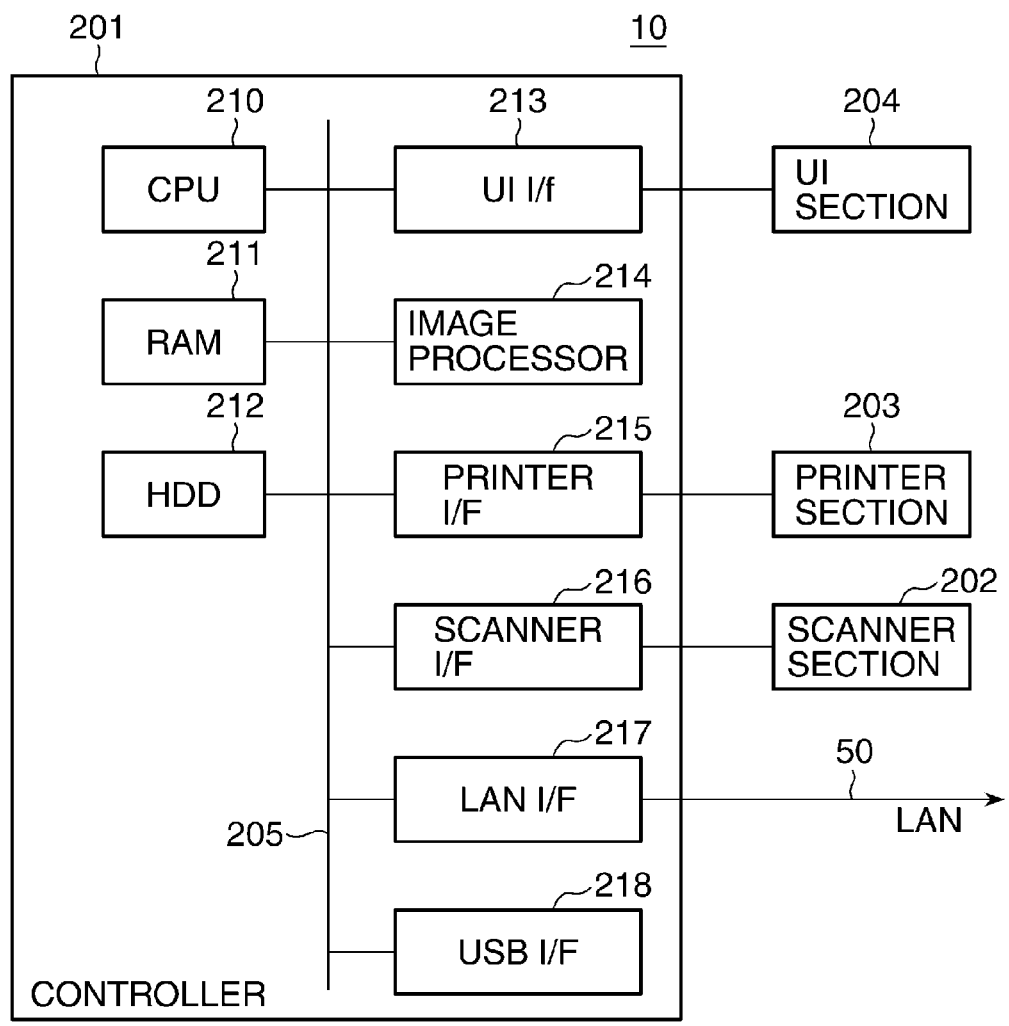
FIG. 2 is a schematic block diagram of a multifunction peripheral which is the information processing apparatus.

FIG. 2 is a schematic block diagram of the multifunction peripheral 10.

A shown in FIG. 2, a controller 201 is electrically connected to a scanner section 202 and a printer section 203, and on the other hand is connected to external apparatuses including the server 20 and the PC 30, via the LAN 50. This enables the multifunction peripheral 10 to transmit and receive data files and apparatus information.

Also, the controller 201 is capable of connecting to a USB device via a USB (Universal Serial Bus) interface 218 and acquiring data stored in the USB device.

The controller 201 comprises a CPU (Central Processing Unit) 210, a RAM (Random Access Memory) 211, an HDD (Hard Disk Drive) 212, a UI (User Interface) interface 213, an image processor 214, a printer interface 215, a scanner interface 216, a LAN (Local Area Network) interface 217, the USB interface 218, and a system bus 205.

The CPU 210 performs centralized control of access to various kinds of devices connected thereto and also performs centralized control of various kinds of processing performed within the controller. The RAM 211 is a system work memory used by the CPU 210 for its operation and also used as a memory for temporarily storing e.g. image data. The RAM 211 comprises e.g. an SRAM (Static Radom Access Memory) in which stored data is preserved even after the power of the apparatus is switched off, and a DRAM (Dynamic Random Access Memory) from which stored data is deleted after the power is switched off.

The UI interface 213 provides interface between the system bus 205 and a UI section 204. The UI interface 213 receives image data to be displayed on the UI section 204 from the system bus 205 and outputs the same to the UI section 204, and also outputs information input from the UI section 204 to the system bus 205. The UI section 204 is composed of e.g. a touch panel display and operating keys.

The LAN interface 217 provides interface between the LAN 50 and the system bus 205 and performs input and output of information. The image processor 214 performs correction, processing, and editing of image data input thereto. For image data to be printed out, the image processor 214 performs correction, resolution conversion, etc. of the printer section 203. Further, the image processor 214 performs rotation processing on image data, and performs compression/expansion processing, by JPEG on multivalued image data, and by JBIG, MMR, MH or the like on binary image data.

The HDD 212 records authentication data of users who use the multifunction peripheral 10, and transmission destination information, registered by the user, on e-mails and data files. It is not necessarily required to record the authentication data and transmission destination information of users who use the multifunction peripheral 10 in the HDD 212 of the multifunction peripheral 10. When equivalent information is recorded in the server 20, for example, the system may be configured to acquire the information e.g. via the LAN 50.

Next, a description will be given of the configuration of user authentication information and address book information recorded in the HDD 212 with reference to FIG. 3.

Figure 3:
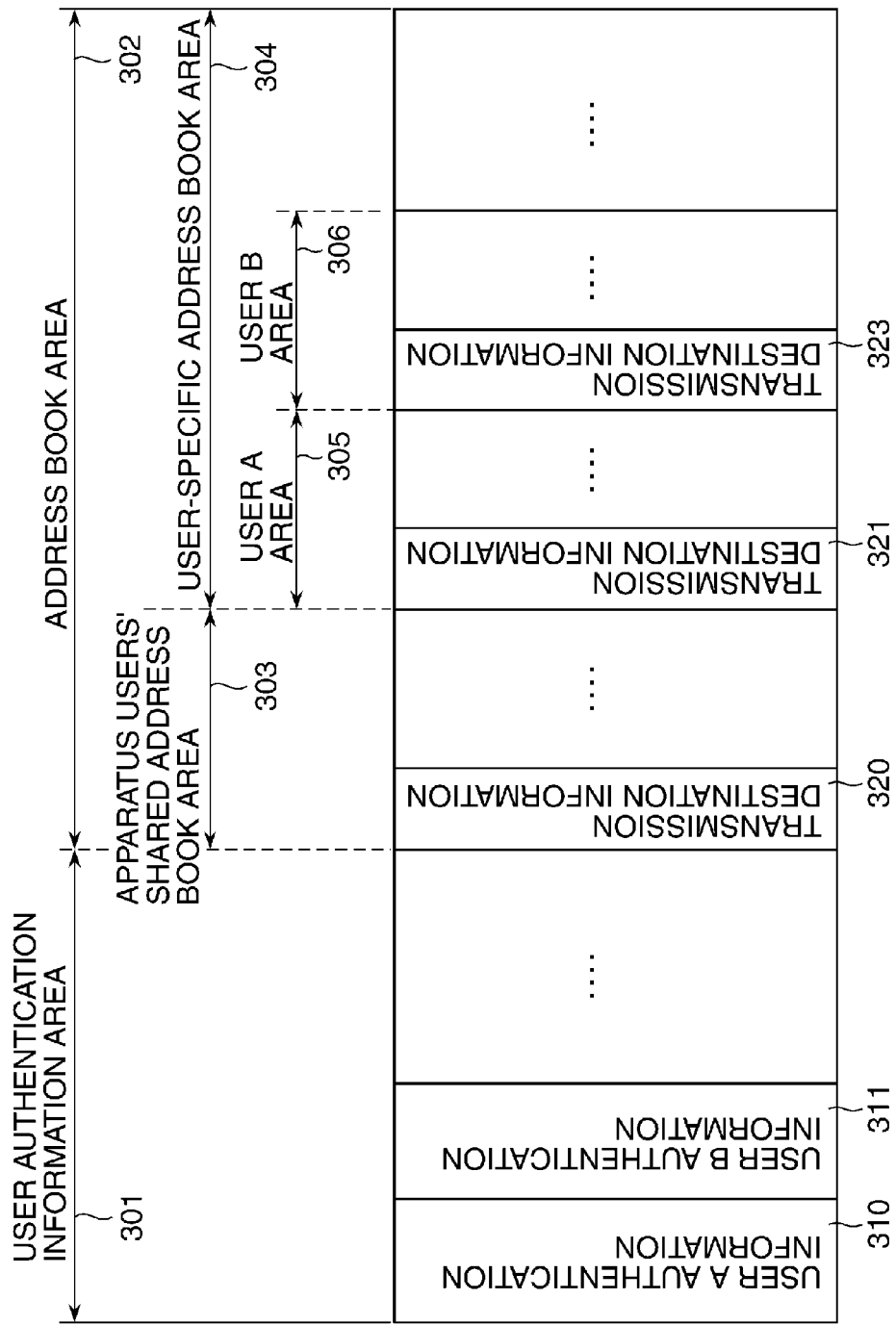
FIG. 3 is a schematic diagram showing the configuration of information recorded in an HDD.

FIG. 3 is a schematic diagram showing the configuration of the information recorded in the HDD 212.

In the HDD 212, there are set two recording areas, i.e. a user authentication information area 301 for storing user authentication information and an address book area 302 for storing transmission destination information.

The user authentication information area 301 stores (records) user authentication information on users who use the multifunction peripheral 10. In the illustrated example, there are set a user A authentication information area 310 for storing authentication information on a user A, and a user B authentication information area 311 for storing authentication information on a user B. The user A authentication information area 310 and the user B authentication information area 311 may store any information insofar as it can be used for authenticating the associated users. For example, the information may be a pair of a user name and a password, or may be biological information, such as user's fingerprints.

In the address book area 302, there are set two recording areas, i.e. an apparatus users' shared address book area 303 and a user-specific address book area 304. The apparatus users' shared address book area 303 records transmission destination information (320 and so forth) accessible to all the users who use the multifunction peripheral 10. The apparatus users' shared address book area 303 is an example of a first storage unit of the present invention.

The user-specific address book area 304 records transmission destination information (321, 323, and so forth) for users who uses the multifunction peripheral 10. In the illustrated example, there are set a user A area 305 that stores transmission destination information (e.g. 321) for individual use by the user A only and a user B area 306 that stores transmission destination information (e.g. 323) for individual use by the user B only. The user-specific address book area 304 is an example of a second storage unit of the present invention.

When the multifunction peripheral 10 accepts an operation e.g. from the user A for registering transmission destination information 321 in the user-specific address book area 304, the multifunction peripheral 10 records the transmission destination information 321, which is input, in the user A area 305 within the HDD 212.

Next, a description will be given of contents of the transmission destination information 321 with reference to FIG. 4.

Figure 4:
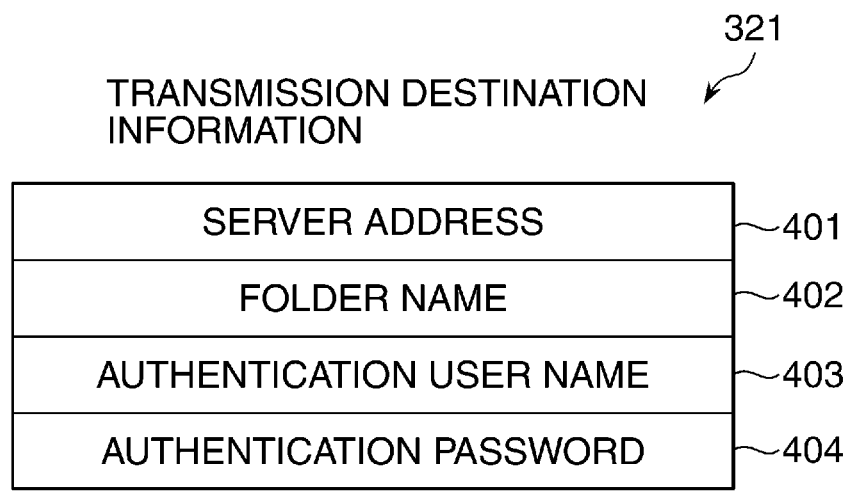
FIG. 4 is a schematic diagram showing the configuration of transmission destination information.

FIG. 4 is a schematic diagram showing the configuration of the transmission destination information 321. This description will be given assuming that the transmission destination information 321 stored in the user A area 305 is for transmitting document data using the FTP (File Transfer Protocol) from the multifunction peripheral 10 to the server 20.

In the transmission destination information 321, a server address 401, a folder name 402, an authentication user name 403, and an authentication password 404 are stored. The server address 401 is an address necessary for the multifunction peripheral 10 to specify the server 20 on the LAN 50. As the server address 401, there may be mentioned an IP address and a URL (Uniform Resource Locator) that are used in TCP/IP communication, for example, but the server address 401 may be any other information insofar as it can be used for specifying the location of the server on the network.

The folder name 402 indicates a storage location of document data within the server 20. The form of representation of the storage location may be any form insofar as it permits identification of the storage location by the server 20. The authentication user name 403 and the authentication password 404 are authentication information used when logging in to the server 20 by FTP.

Before transmitting document data to the server 20, the multifunction peripheral 10 transmits the authentication user name 403 and the authentication password 404 to the server 20. The server 20 permits FTP communication with the multifunction peripheral 10 if FTP communication is permitted for a user associated with the received authentication user name 403 and authentication password 404. On the other hand, if FTP communication is not permitted for the user associated with the authentication user name 403 and the authentication password 404, the server 20 does not permit subsequent FTP communication as a login error.

Next, a description will be given of a destination information transfer process performed by the multifunction peripheral 10 when transmission destination information managed in a user-specific address book is transferred to the apparatus users' shared address book, with reference to FIG. 5. It should be noted that the transfer of the transmission destination information may be performed either in such a manner that after the transfer, the transmission destination information does not remain in the user-specific address book, or in such a manner that even after the transfer, the transmission destination information remains in the user-specific address book (in other words, the transmission destination information is copied).

Figure 5:
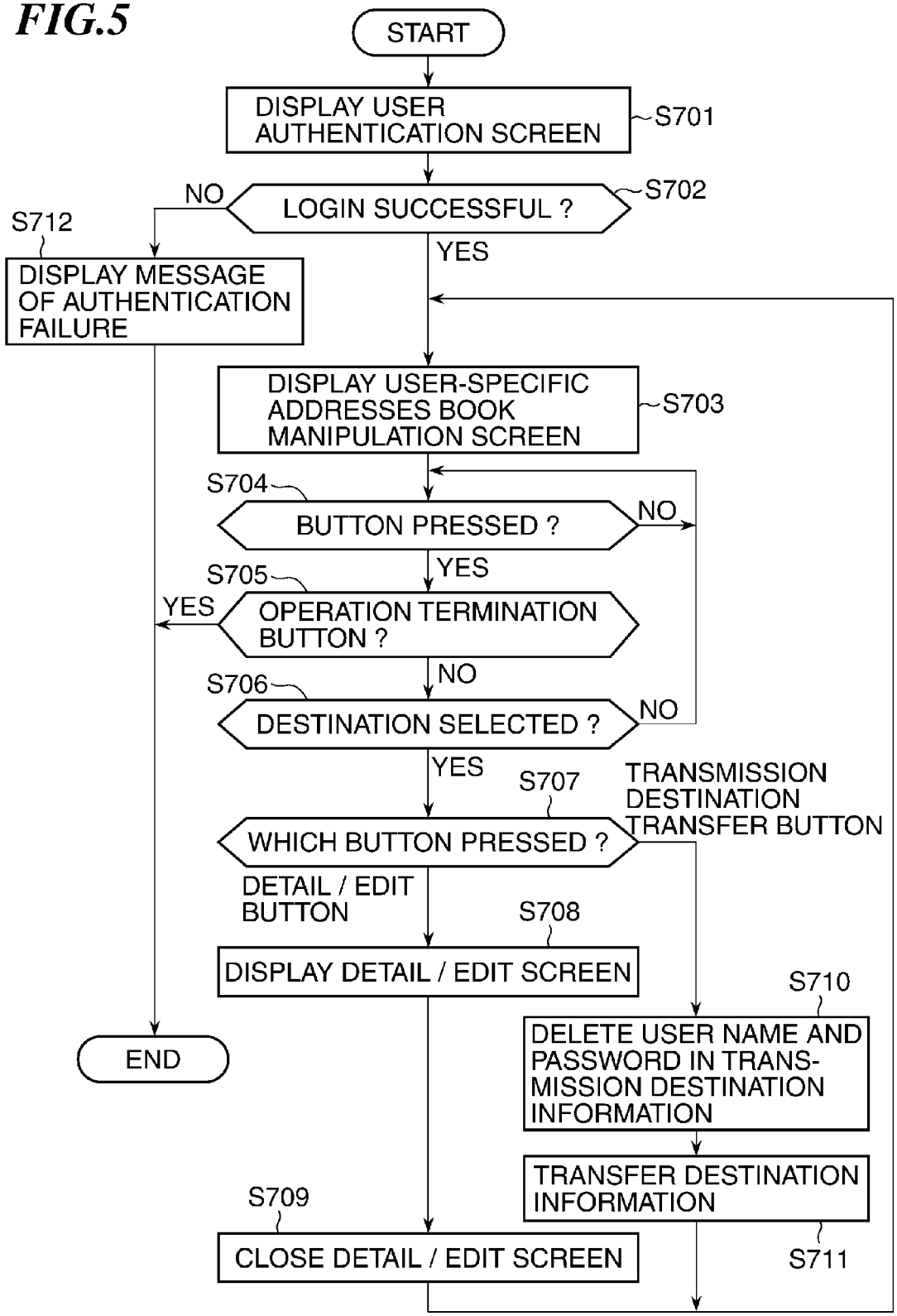
FIG. 5 is a flowchart of a destination information transfer process performed by the multifunction peripheral when transmission destination information within a user A area is transferred to an apparatus users' shared address book area.

FIG. 5 is the flowchart of the destination information transfer process performed by the multifunction peripheral 10 when the transmission destination information 321 within the user A area 305 is transferred to the apparatus users' shared address book area 303. The destination information transfer process is performed by the CPU 210 executing a control program read out from e.g. the HDD 212.

Figure 6:
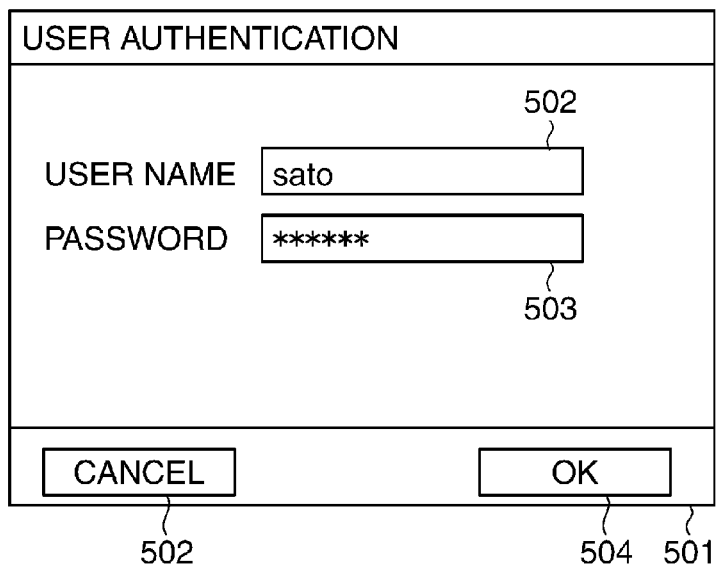
FIG. 6 is a view showing an example of a user authentication screen displayed on a UI section of the multifunction peripheral.

As shown in FIG. 5, when a user instructs the multifunction peripheral 10 to manipulate a user-specific address book, the multifunction peripheral 10 first displays a user authentication screen 501 for identifying the user attempting to use the user-specific address book, on the UI section 204 (step S701). FIG. 6 shows an example of the user authentication screen 501 displayed on the UI section 204.

The user authentication screen 501 accepts respective entries of a user name and a password that are required for performing authentication. In the user authentication screen 501, there are disposed a user name entry area 502 for entering the user name and a password entry area 503 for entering the password. Also, in the user authentication screen 501, there are disposed an authentication start (OK) button 504 for accepting an instruction to start the authentication and an authentication cancel (cancel) button 505 for canceling the above-mentioned entry operation. Although in the present embodiment, the user name entry area 502 and the password entry area 503 are disposed in the user authentication screen 501 since the user name and the password are used as authentication information, this is not limitative. In other words, the user authentication screen 501 may be any screen of any configuration insofar as it enables entry of information for verifying against the user authentication information stored in the user authentication information area 301.

When the authentication start button 504 is pressed on the user authentication screen 501, the multifunction peripheral 10 determines whether or not the entries in the user name entry area 502 and the password entry area 503 match any item of the user authentication information registered in the user authentication information area 301 (step S702). If it is determined that there is any authentication information item that matches the input contents, the multifunction peripheral 10 judges that the authentication (login) is successful and displays a user-specific address book manipulation screen 601 as shown in FIG. 7 on the UI section 204 (step S703).

Figure 7:
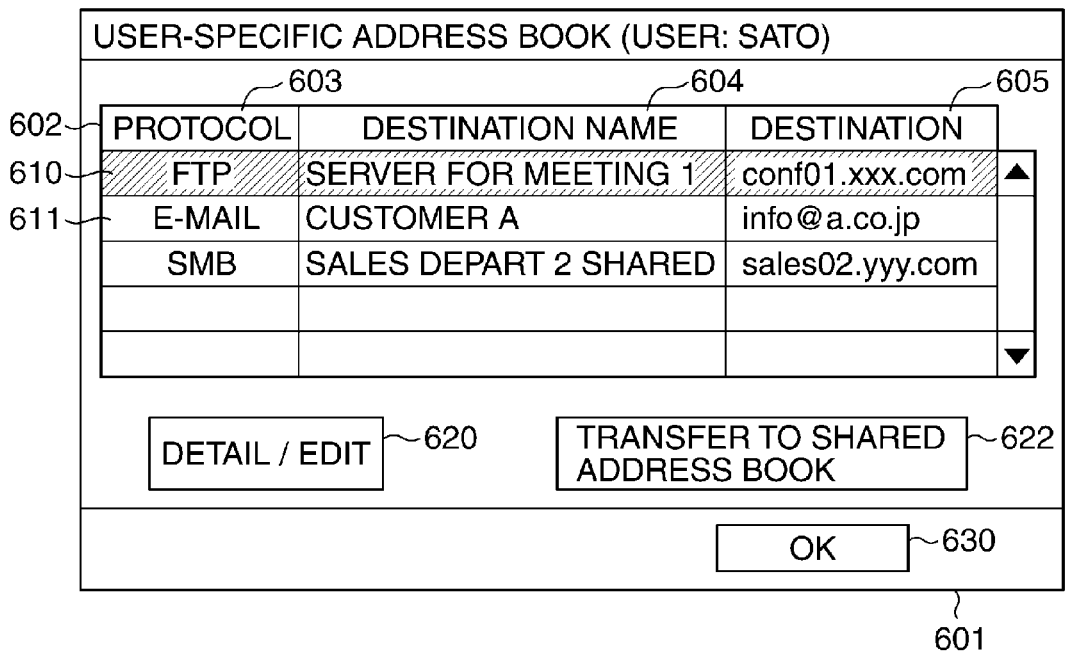
FIG. 7 is a view showing an example of a user-specific address book manipulation screen displayed on the UI section of the multifunction peripheral.

FIG. 7 is a view showing an example of the user-specific address book manipulation screen displayed on the UI section 204 of the multifunction peripheral 10.

On the user-specific address book manipulation screen 601, there are disposed a transmission destination list 602 that displays transmission destinations registered in the user-specific address book, a detail/edit button 620 for performing a manipulation on a selected transmission destination, a transmission destination transfer button 622, and an operation termination (OK) button 630.

The transmission destination list 602 comprises a protocol column 603, a destination name column 604, and a destination column 605, in which are respectively displayed protocols, destination names, and destination identifying information items of the transmission destinations registered in the address book. A transmission destination selected by the user is displayed in a format different from the other destinations in order to indicate the selection.

Referring again to FIG. 5, if it is determined in the step S702 that there is no authentication information that matches the input contents, the multifunction peripheral 10 displays a message to the effect that the authentication is unsuccessful on the UI section 204 (step S712), followed by terminating the present process. The present process is also terminated when the authentication cancel button 505 is pressed on the user authentication screen 501.

After the authentication is successful in the step S702 and the user-specific address book manipulation screen 601 is displayed in the step S703, the multifunction peripheral 10 determines whether or not any of the buttons on the screen is pressed (step S704). Here, if none of the buttons is pressed, it is determined again whether or not any of the buttons is pressed. Then, if any of the buttons is pressed by the user, the multifunction peripheral 10 determines whether or not the pressed button is the operation termination (OK) button 630 (step S705). If it is determined that the pressed button is the operation termination (OK) button 630, the multifunction peripheral 10 terminates the present process.

On the other hand, if it is determined that the pressed button is not the operation termination (OK) button 630, the multifunction peripheral 10 determines whether or not any destination is selected out of the transmission destinations displayed in the transmission destination list 602 (step S706). If it is judged here that none of the destinations is selected, there is no destination to be manipulated, and hence the multifunction peripheral 10 again determines whether or not any of the buttons is pressed.

If it is determined in the S706 that a destination is selected, the multifunction peripheral 10 determines which button is pressed (step S707). Then, if it is judged that the detail/edit button 620 is pressed, the multifunction peripheral 10 displays detailed information on the selected transmission destination in a detail/edit screen on the UI section 204 in an editable manner (step S708). Then, when the detail/edit screen is closed (step S709), the present process returns to the step S703.

On the other hand, if it is determined in the step S707 that the transmission destination transfer button 622 is pressed, the multifunction peripheral 10 performs deletion of the authentication user name 403 and the authentication password 404 from the transmission destination information 321 on the selected transmission destination (step S710). The "deletion" mentioned here is intended to mean at least exclusion from information to be transferred. This step corresponds to a function of a first deletion unit of the present invention. Although in the present embodiment, the authentication user name 403 and the authentication password 404 are deleted as considering them as personal information, if any other user-specific personal information is included in the transmission destination information, this information may be also deleted.

After deleting the personal information from the selected transmission destination information, the multifunction peripheral 10 transfers the transmission destination information from the user-specific address book area 304 to the apparatus users' shared address book area 303 (step S711), and then returns to the step S703.

As described heretofore, in the above first embodiment, before the transmission destination information 321 is transferred from the user-specific address book area 304 to the apparatus users' shared address book area 303, the personal information (the authentication user name 403 and the authentication password 404) included in the transmission destination information 321 is deleted. By doing so, it is possible to prevent the personal information from being made accessible to an unspecified number of users. As a result, even when transmission destination information managed in a user-specific address book is transferred to the apparatus users' shared address book, it is possible to prevent user's personal information from leaking.

Next, a description will be given of an image forming apparatus according to a second embodiment of the present invention which before transfer of transmission destination information from a user-specific address book to the apparatus users' shared address book, deletes personal information included in the transmission destination information, and then prompts the user to enter alternate personal information. Component elements identical to those of the first embodiment are denoted by the same reference numerals, and detailed description thereof is omitted.

FIG. 8 is a view showing an example of an alternate entry request screen 801 displayed on the UI section 204 of the multifunction peripheral 10 which is the information processing apparatus according to the second embodiment.

After the authentication user name 403 and the authentication password 404 are deleted from the transmission destination information to be transferred, the alternate entry request screen 801 is displayed on the UI section 204 to prompt the user to enter an alternate authentication user name and an alternate authentication password.

On the alternate entry request screen 801, there are disposed an alternate login user information entry area 802, an alternate authentication password information entry area 803, and an entry termination (OK) button 804. An alternate authentication user name is entered in the alternate login user information entry area 802. An alternate authentication password is entered in the alternate authentication password information entry area 803. The alternate authentication user name and password may be authentication information shared by all the users, for example.

Figure 9:
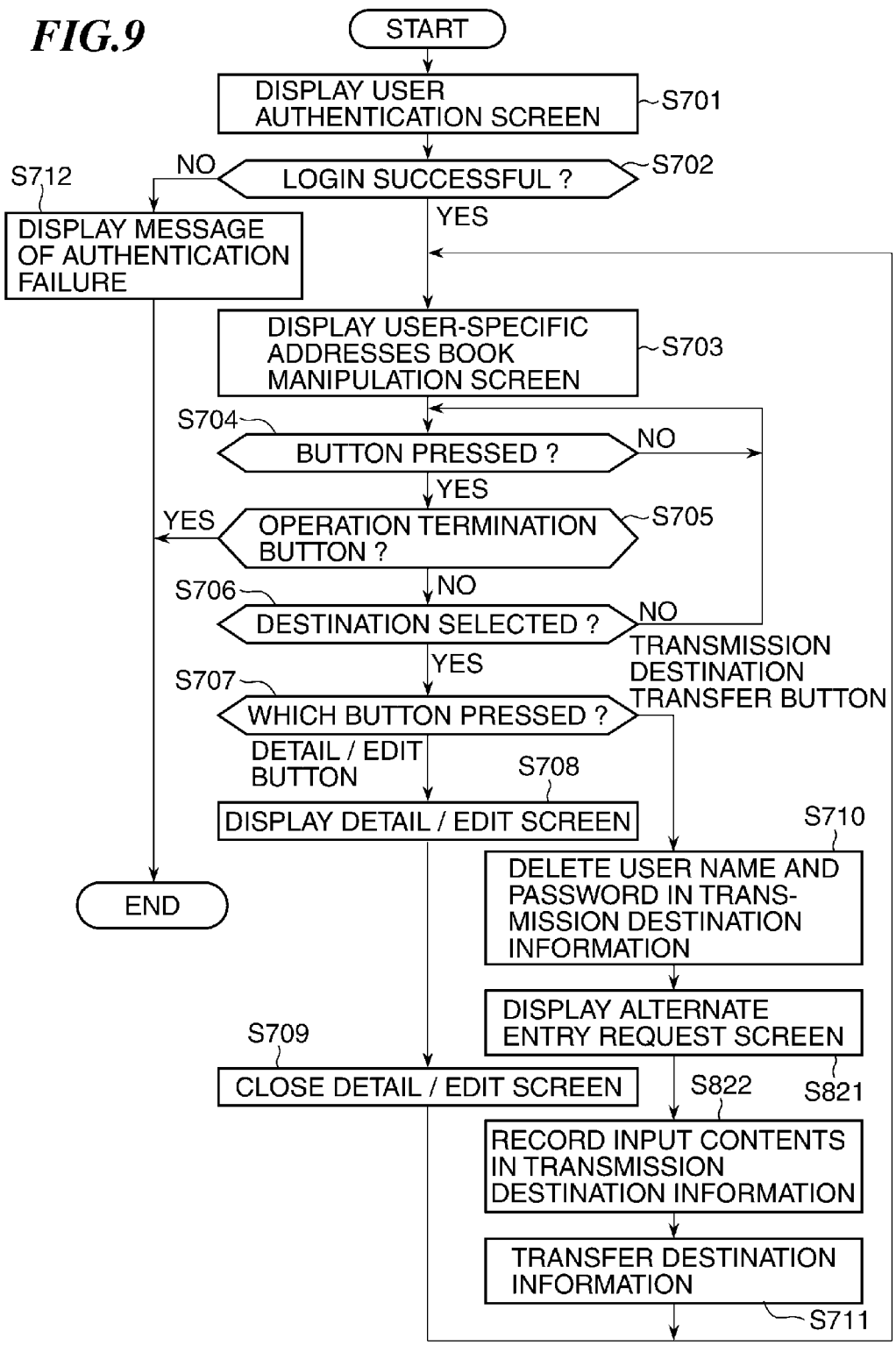
FIG. 9 is a flowchart of a destination information transfer process performed by the multifunction peripheral when transmission destination information within a user A area is transferred to an apparatus users' shared address book area.

FIG. 9 is a flowchart of a destination information transfer process performed by the multifunction peripheral 10 which is the information processing apparatus according to the second embodiment, when the transmission destination information 321 within the user A area 305 is transferred to the apparatus users' shared address book area 303. In FIG. 9, steps identical to those of the process shown in FIG. 5 are denoted by the same step numbers, and detailed description thereof is omitted.

After deleting the authentication user name 403 and the authentication password 404 from the transmission destination information on the transmission destination in the step S710, the multifunction peripheral 10 displays the alternate entry request screen 801 on the UI section 204 (step S821). Then, after alternate information is entered in the alternate login user information entry area 802 and the alternate authentication password information entry area 803 on the alternate entry request screen 801, when the entry termination (OK) button 804 is pressed, the present process proceeds to a step S822.

In the step S822, the multifunction peripheral 10 records the respective contents (alternate information) entered in the alternate login user information entry area 802 and the alternate authentication password information entry area 803, in the selected transmission destination information. This step corresponds to a function of a first recording unit of the present invention. As a result, the authentication user name and the authentication password that are entered on the alternate entry request screen 801 are stored in areas of the transmission destination information 321 where the authentication user name 403 and the authentication password 404 were recorded. Then, the multifunction peripheral 10 performs the transfer of the destination information (step S711).

As described above, in the second embodiment, before the transmission destination information 321 is transferred from the user-specific address book area 304 to the apparatus users' shared address book area 303, the user is prompted to enter the alternate personal information after the personal information included in the transmission destination information 321 is deleted. By doing so, after the transmission destination is transferred, it is possible to immediately use the transmission destination to transmit document data.

A description will be given of a multifunction peripheral (image forming apparatus) as an information processing apparatus according to a third embodiment of the present invention which, after deleting personal information included in transmission destination information, records predetermined values recorded in advance in the HDD 212 as alternate personal information in the transmission destination information. Component elements identical to those of the first and second embodiments are denoted by the same reference numerals, and detailed description thereof is omitted.

Figure 10:
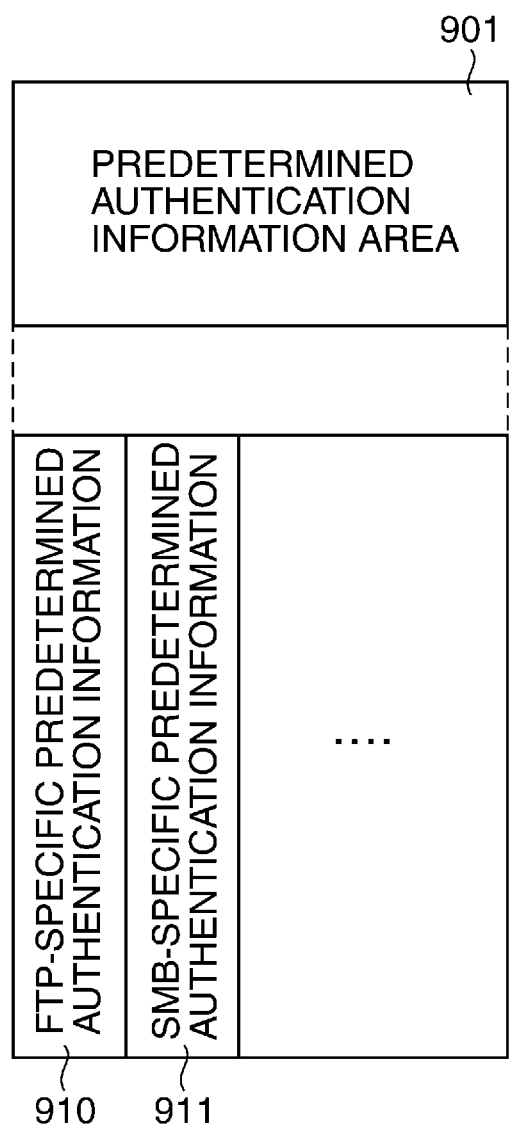
FIG. 10 is a view showing an example of predetermined authentication information used by a multifunction peripheral which is an information processing apparatus according to a third embodiment of the present invention.

FIG. 10 is a view showing an example of predetermined authentication information used by the multifunction peripheral which is the information processing apparatus according to the third embodiment.

The predetermined authentication information comprises predetermined values recorded, as alternate personal information, in advance in a predetermined authentication information area 901 set in the HDD 212. The predetermined authentication information area 901 is an example of a third storage unit of the present invention. The predetermined authentication information area 901 is an area where predetermined protocol-specific authentication information is recorded. In the illustrated example, FTP-specific predetermined authentication information 910 and SMB-specific predetermined authentication information 911 are stored as the predetermined protocol-specific authentication information. The FTP-specific predetermined authentication information 910 is authentication information used in a transmission destination of the FTP protocol according to specifications thereof. The SMB-specific predetermined authentication information 911 is authentication information used in a transmission destination of the SMB protocol according to specifications thereof. It is possible to record authentication information to be used by default according to each of protocols that can be used in the multifunction peripheral 10, in the predetermined authentication information area 901. Information recorded in the predetermined authentication information area 901 may be set in advance in the multifunction peripheral 10 or the user may be permitted to change the information using e.g. the UI section 204.

Figure 11:
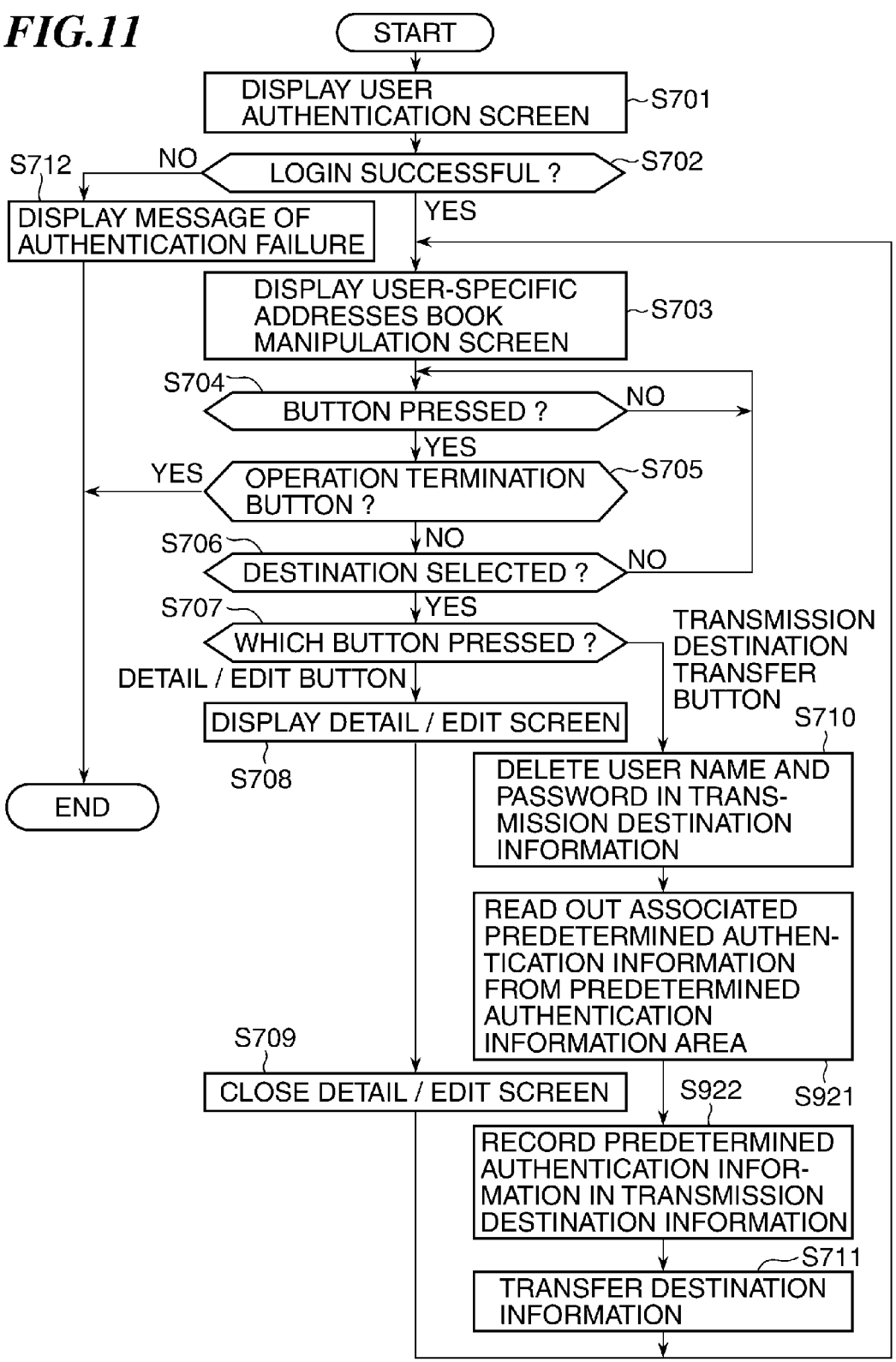
FIG. 11 is a flowchart of a destination information transfer process performed by the multifunction peripheral when transmission destination information within a user A area is transferred to an apparatus users' shared address book area.

FIG. 11 is a flowchart of a destination information transfer process performed by the multifunction peripheral 10 which is the information processing apparatus according to the third embodiment when the transmission destination information 321 within the user A area 305 is transferred to the apparatus users' shared address book area 303. In FIG. 11, steps identical to those of the process shown in FIG. 5 are denoted by the same step numbers, and description thereof is omitted.

After deleting the authentication user name 403 and the authentication password 404 from the transmission destination information on the transmission destination in the step S710, the multifunction peripheral 10 reads out associated predetermined authentication information from the predetermined authentication information area 901 (step S921). Then, the multifunction peripheral 10 records the predetermined authentication information read out in the step S921, in the transmission destination information (step S922). This step corresponds to a function of a second recording unit of the present invention. As a result, the predetermined authentication information recorded in advance in the HDD 212 is stored in the areas of the transmission destination information 321 where the authentication user name 403 and the authentication password 404 were recorded. Then, the multifunction peripheral 10 performs the transfer of the destination information (step S711).

In the above-described third embodiment, before the transmission destination information 321 is transferred from the user-specific address book area 304 to the apparatus users' shared address book area 303, the personal information included in the transmission destination information 321 is deleted and predetermined personal information that is recorded in advance is recorded as the alternate personal information. By doing so, after the transmission destination is transferred, it is possible to immediately use the transmission destination to transmit document data without prompting the user to enter information.

Next, a description will be given of a multifunction peripheral (image forming apparatus) as an information processing apparatus according to a fourth embodiment of the present invention, which is equipped with a function for entering personal information each time document data is transmitted and enables the function before transferring transmission destination information from a user-specific address book to the apparatus users' shared address book. For example, the multifunction peripheral 10 is configured such that it is equipped with a function for enabling personal information to be entered each time document data is transmitted.

Component elements identical to those of the first to third embodiments are denoted by the same reference numerals, and detailed description thereof is omitted.

Figure 12:
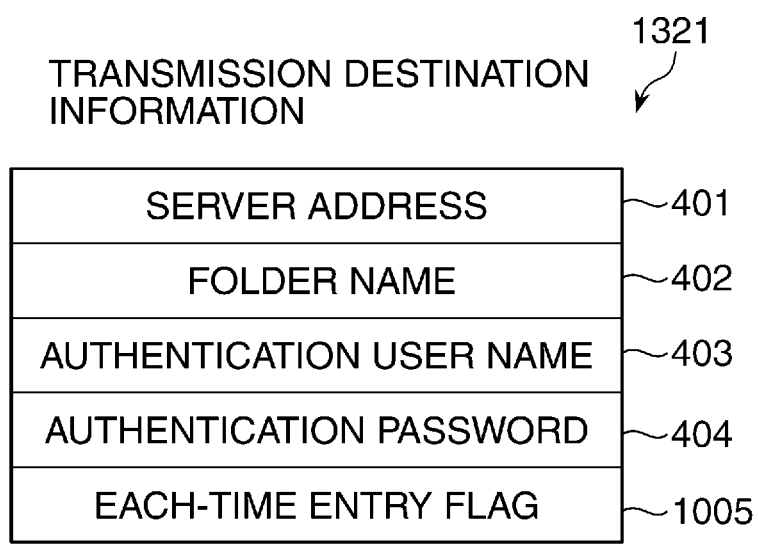
FIG. 12 is a schematic diagram showing the configuration of transmission destination information used by a multifunction peripheral which is an information processing apparatus according to a fourth embodiment of the present invention.

FIG. 12 is a schematic diagram showing the configuration of transmission destination information 1321 used by the multifunction peripheral which is the information processing apparatus according to the fourth embodiment. Similarly to the above-described first to third embodiments, the following description will be given assuming that transmission destination information 1321 for transmitting document data by FTP from the multifunction peripheral 10 to the server 20 is stored in the user A area 305.

The transmission destination information 1321 stores the server address 401, the folder name 402, the authentication user name 403, the authentication password 404, and an each-time entry flag 1005 are stored. The server address 401 to the authentication password 404 are the same as those shown in FIG. 4, and hence description thereof is omitted.

Before transmitting document data to the server 20, the multifunction peripheral 10 transmits the authentication user name 403 and the authentication password 404 to the server 20. The server 20 permits FTP communication to the multifunction peripheral 10 if FTP communication is permitted for the user associated with the received authentication user name 403 and authentication password 404. On the other hand, if FTP communication is not permitted for the user associated with the authentication user name 403 and authentication password 404, the server 20 does not permit subsequent FTP communication as the login error.

The each-time entry flag 1005 is a flag (control information) that controls whether or not to enter personal information each time document data is transmitted using the transmission destination information 1321. If the value of the flag is 1, it indicates that each user about to perform data transmission has to enter personal information each time. On the other hand, if the value of the flag is 0, it indicates that the user about to perform data transmission does not have to enter personal information each time. This each-time entry flag 1005 may be configured such that either all the users of the multifunction peripheral 10 can change the each-time entry flag 1005 using e.g. the UI section 204, or only users with special authority, such as administrators, can change the same.

Figure 13:
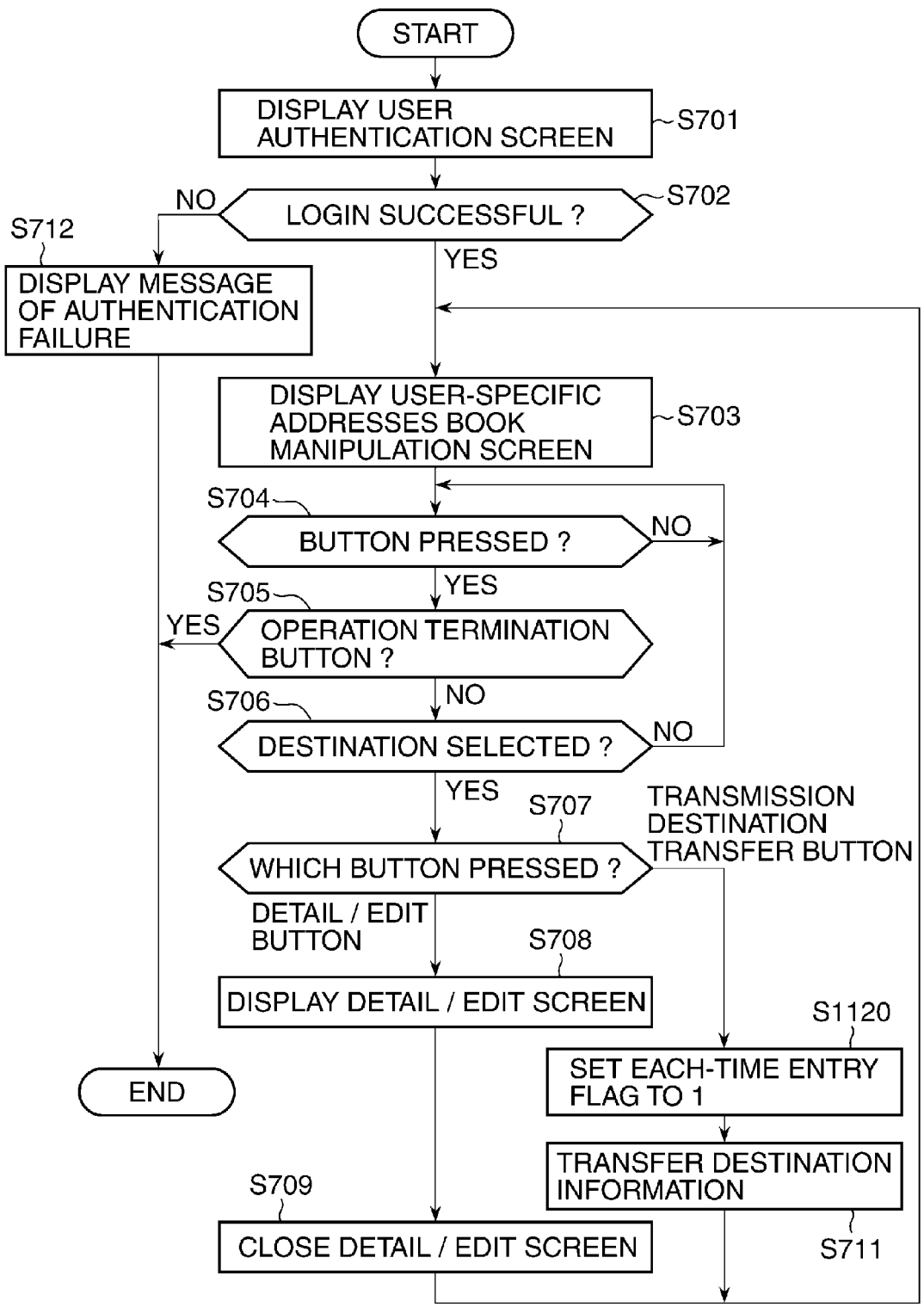
FIG. 13 is a flowchart of a destination information transfer process performed by the multifunction peripheral when transmission destination information within a user A area is transferred to an apparatus users' shared address book area.

FIG. 13 is a flowchart of a destination information transfer process performed by the multifunction peripheral 10 which is the information processing apparatus according to the fourth embodiment when the transmission destination information 1321 within the user A area 305 is transferred to the apparatus users' shared address book area 303. In FIG. 13, steps identical to those of the process shown in FIG. 5 are denoted by the same step numbers, and detailed description thereof is omitted.

If it is determined that the transmission destination transfer button 622 is pressed in the step S707, the multifunction peripheral 10 sets the each-time entry flag 1005 included in the transmission destination information 1321 to 1 on a selected transmission destination (step S1120). After setting the each-time entry flag 1005 to 1, the multifunction peripheral 10 transfers the selected transmission destination information 1321 from the user-specific address book area 304 to the apparatus users' shared address book area 303 (step S1121).

As described above, if the multifunction peripheral 10 is equipped with the function for entering personal information each time document data is transmitted, the function is enabled before the transmission destination information 1321 is transferred from the user-specific address book area 304 to the apparatus users' shared address book area 303. By doing so, the user is requested to enter personal information each time the user transmits document data using the transmission destination information stored in the apparatus users' shared address book, whereby it is possible to prevent personal information from being made accessible to an unspecified number of users.

In the image forming apparatus according to the above-described fourth embodiment, for example, when the user A transfers transmission destination information registered in the user A's own user-specific address book to the apparatus users' shared address book, the user A sets (enables) the each-time entry flag 1005 included in the transmission destination information. However, when all the users of the multifunction peripheral 10 can change the value of the each-time entry flag 1005, if a user other than the user A clears (disables) the each-time entry flag 1005 of the transferred transmission destination information, the personal information entered by the user A is made accessible to other users.

Therefore, the multifunction peripheral 10 may be configured such that if the value of the each-time entry flag 1005 is changed by any user, the personal information included in the transmission destination information 1321 is deleted. This processing corresponds to a function of a second deletion unit of the present invention. By doing so, even if the value of the each-time entry flag 1005 is changed by any user, it is possible to protect the personal information recorded in the transmission destination information 1321.

An image forming apparatus according to a sixth embodiment of the present invention is configured such that in a case where the each-time entry flag 1005 is set to 2, each user is requested to enter his/her personal information each time the user is about to transmit document data and is restricted from changing the value of the each-time entry flag 1005. In this case, the each-time entry flag 1005 may be configured such that only users with special authority, such as administrators, can change the value thereof.

More specifically, in the step S1120 appearing in FIG. 13, the each-time entry flag 1005 is set to 2 instead of 1. In this way, as for transmission destination information transferred from the user-specific address book area 304 to the apparatus users' shared address book area 303, the function for entering personal information each time cannot be disabled, whereby it is possible to further reduce the possibility of the leakage of personal information.

In the above-described first to sixth embodiments, although the descriptions are given of methods for preventing personal information from leaking with respect to a single piece of transmission destination information, each method may be applied to a plurality of pieces of transmission destination information at a time. For example, in a case where all pieces of transmission destination information included in the user A area 305 are transferred to the apparatus users' shared address book area 303, any of the methods described in the aforementioned first to sixth embodiments may be applied to all the pieces of transmission destination information collectively.

In the above-described first to seventh embodiments, although the descriptions are given by taking the multifunction peripheral 10 as an example of the image forming apparatus which is a component of the document management system, this is not limitative, but the present invention may be applied to information processing apparatuses, such as personal computers (PCs), and other apparatuses, insofar as such apparatuses are configured to be capable of managing transmission destination information.

Further, each step of the present invention may also be accomplished by executing software (programs) acquired via a network or various types of storage media, using a processing device (CPU or processor) of an image forming apparatus, an information processing apparatus, or the like.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-096999, filed Apr. 13, 2009, which is hereby incorporated by reference herein in its entirety.

What is claimed is:

1. An information processing apparatus comprising:
a storage unit configured to store a first address book which is accessible to a plurality of users who use the information processing apparatus and a second address book which is accessible to a specific user; and
a destination transfer unit configured to transfer destination information included in the second address book stored in said storage unit to the first address book stored in said storage unit in response to an operation by the specific user;
wherein said destination transfer unit transfers, in the case where the destination information to be transferred to the first address book has specific information, the destination information with the specific information excluded to the first address book.

2. The information processing apparatus according to claim 1, further comprising:
an input unit configured to input alternate information substituting for the specific information excluded from the destination information when the destination information is transferred by said destination transfer unit;
wherein said destination transfer unit transfers to the first address book, the alternate information input by said input unit as information substituting the specific information excluded from the destination information when the destination information is transferred by said destination transfer unit.

3. The information processing apparatus according to claim 2, wherein said input unit inputs the alternative information before the operation by the specific user in response to which said destination transfer unit transfers the destination information.

4. The information processing apparatus according to claim 1, further comprising:
a memory unit configured to store in advance alternate information substituting for the specific information excluded from the destination information when the destination information is transferred by said destination transfer unit; and
wherein said destination transfer unit transfers to the first address book, the alternate information stored in said memory unit as information substituting the specific information in the destination information, which is excluded from the destination information when the destination information is transferred by said destination transfer unit.

5. The information processing apparatus according to claim 1, wherein the specific information, which is excluded from the destination information when the destination information is transferred by said destination transfer unit, includes authentication information for use in logging in to an external server.

6. The information processing apparatus according to claim 1, wherein the second address book is an address book which is available when user authenticate is successful, and the first address book is an address book which is available without the need for performing the user authentication.

7. The information processing apparatus according to claim 1, wherein said destination transfer unit further performs a copy process of copying the destination information to be transferred and storing the destination information in the second address book so that same information as the destination information remains in the second address book even after the destination information is transferred to the first address book.

8. An information processing apparatus comprising:
a storage unit configured to store a first address book which is accessible to a plurality of users who use the information processing apparatus
and a second address book which is accessible to a specific user;
a destination transfer unit configured to transfer destination information included in the second address book to the first address book in response to an operation by the specific user; and
an addition unit configured to be operable when the destination information is transferred by said destination transfer unit, to add control information for requesting a user to input a predetermined information to be included in the destination information each time data transmission is performed, to the destination information.

9. The information processing apparatus according to claim 8, further comprising:
a changing unit configured to change the control information that is added to the destination information by said addition unit, in response to an operation by a user;
wherein in a case where the control information added to the destination information is changed by said changing unit and when data transmission is performed by using the destination information, the predetermined information included in the destination information is made inaccessible to a user other than the specific user.

10. The information processing apparatus according to claim 8, wherein the control information added to the destination information by said addition unit includes information for preventing the control information from being changed.

11. The information processing apparatus according to claim 8, wherein the predetermined information includes authentication information used for logging in to an external server.

12. The information processing apparatus according to claim 8, wherein the second address book is an address book which is available when user authenticate is successful, and the first address book is an address book which is available without the need for performing the user authentication.

13. The information processing apparatus according to claim 8, wherein said destination transfer unit further performs a copy process of copying the destination information to be transferred and storing the destination information in the second address book so that same information as the destination information remains in the second address book even after the destination information is transferred to the first address book.

14. A method of processing information for an information processing apparatus, the information processing apparatus including a first storage unit configured to store a first address book which is accessible to a plurality of users who use the information processing apparatus and a second address book which is accessible to a specific user, the method comprising:
   transferring destination information included in the second address book stored in the storage unit to the first address book stored in said storage unit;
   wherein, in the case where the destination information to be transferred to the first address book has specific information, the destination information is transferred with the specific information excluded to the first address book.

15. A method of processing information for an information processing apparatus, the information processing apparatus including a storage unit configured to store a first address book which is accessible to a plurality of users who use the information processing apparatus and a second address book which is accessible to a specific user, the method comprising:
   transferring the destination information included in the second address book to the first address book; and
   adding, when the destination information is transferred by said transferring, control information for requesting a user to input a predetermined information to be included in the destination information each time data transmission is performed, to the destination information.

16. A non-transitory computer-readable storage medium which stores a computer-readable program for causing a computer to execute a method of processing information for an information processing apparatus, the information processing apparatus including a storage unit configured to store a first address book which is accessible to a plurality of users who use the information processing apparatus and a second address book which is accessible to a specific user,
   wherein the method comprises:
   transferring destination information included in the address book stored in the storage unit to the first address book stored in said storage unit;
   wherein, in the case where the destination information to be transferred to the first address book has specific information, the destination information is transferred with the specific information excluded to the first address book.

17. A non-transitory computer-readable storage medium which stores a computer-readable program for causing a computer to execute a method of processing information for an information processing apparatus, the information processing apparatus including a storage unit configured to store a first address book which is accessible to a plurality of users who use the information processing apparatus and a second address book which is accessible to a specific user,
   wherein the method comprises:
   transferring the destination information included in the second address book to the first address book; and
   adding, when the destination information is transferred by said transferring, control information for requesting a user to input a predetermined information to be included in the destination information each time data transmission is performed, to the destination information.

* * * * *